Dec. 5, 1967 A. L. SHIRLEY 3,355,831

TELEPHONE INDEX

Filed July 20, 1965 2 Sheets-Sheet 1

INVENTOR
ALTON L. SHIRLEY
BY Salter & Michaelson
ATTORNEYS

Dec. 5, 1967 A. L. SHIRLEY 3,355,831

TELEPHONE INDEX

Filed July 20, 1965 2 Sheets-Sheet 2

INVENTOR
ALTON L. SHIRLEY
BY Salter + Michaelson
ATTORNEYS

United States Patent Office 3,355,831
Patented Dec. 5, 1967

3,355,831
TELEPHONE INDEX
Alton L. Shirley, 275 Crestwood Road, Warwick, R.I. 02886
Filed July 20, 1965, Ser. No. 473,431
9 Claims. (Cl. 40—336)

ABSTRACT OF THE DISCLOSURE

A telephone index having a casing that is mounted exteriorly of a telephone and on a front portion thereof, the casing including a pivotally mounted front section that is movable from a generally inclined upright closed position to a horizontal open position to expose an index card as selected by a selector assembly mounted for horizontal movement on said front section.

The present invention relates to a telephone index. More particularly, the present invention relates to an index device that is adapted to be removably attached to a telephone.

Telephone index devices have been in use for many years and operate generally on the principle of movement of an index selector that includes a finger or arm that moves the index cards to the desired exposed position when the index cover is opened. In order to provide for movement of the cards with the cover in the selected manner, the cards are tabbed so as to provide for engagement by the index finger upon movement thereof to the selected position. Although these prior known devices have proved satisfactory for the purpose intended, it was necessary that the device be retained in close proximity to the telephone for practical use thereof. In many instances, it was not feasible or practical to locate the index device next to the telephone, and as a result, the intended purpose of the index device was defeated since the device was not accessible at all times.

The present invention represents a unique departure in telephone index devices over the prior known constructions and not only includes a unique index selector assembly, but further provides for mounting of the device directly on the telephone. As will hereinafter be described, the index device embodied in the present invention has particular use with a desk telephone. However, it will be understood that in one form of the invention, the index device may be used with any style telephone, including wall mounted telephones.

In carrying out the concept of the invention, the index device embodied herein includes a casing that is defined by a rear section and a front section that is pivotally connected to the rear section. The rear section is mounted directly on an accessible portion of the telephone and, in one form of the invention, includes a mounting clip having fingers that project under the forward wall of the telephone, thereby mounting the index device on the front portion of the telephone where it is accessible for use. The casing is located on the telephone such that the index book located therein rests or is disposed at about an angle of 45 degrees with respect to the vertical. The index cards of the book are tabbed in the conventional manner and are pivotally disposed within the casing by means of spring clips that removably mount the cards in place. The selector assembly is movable longitudinally with respect to the axis of the index casing and is provided with a pick-up finger that projects interiorly of the casing and is adapted to engage the tabs of the index cards. Indicia in the form of letters of the alphabet are located on the front surface of the front casing, and a slide selector is adapted to be individually aligned with any of the letters. A pick-up finger that is interconnected to the slide selector is moved rearwardly of the tab of the index card corresponding to the letter aligned with the selector, and upon movement of the front section to an open position with respect to the rear section, the pick-up finger will carry a portion of the index cards forwardly to open the index book to the selected card location. The front and rear sections of the index casing are constructed with details that provide for easy operation of the index device and insure the opening of the casing to the selected card location.

Accordingly, it is an object of the present invention to provide an index device that is mounted directly on a telephone or the like.

Another object of the invention is to provide a telephone index device that is mounted on the front portion of a telephone in inclined position and that includes a front section that is pivotally movable from the inclined closed position to an open position, thereby exposing index cards within the index casing for view.

Still another object is to provide an index device having a plurality of index cards that are removably mounted within a casing by a pair of spring clips.

Still another object is to provide a selector assembly for use in an index device having an interiorly located pick-up finger that is interconnected to a slide and selector located exteriorly of the device, the pick-up finger being movable for engagement with index cards that correspond to a letter indicated by the selector.

Still another object is to provide a selector assembly that provides for positive location of the pick-up finger associated therewith when selecting an index card.

Still another object is to provide a plurality of projections on the front and rear sections of a casing of an index device for locating an index book within the casing in the proper oriented position for operation of the device.

Other objects, features and advantages of the invention will become apparent as the description thereof proceeds when considered in connection with the accompanying illustrative drawings.

In the drawings, which illustrate the best mode presently contemplated for carrying out the invention:

Figures 1, 2, 3, 8:
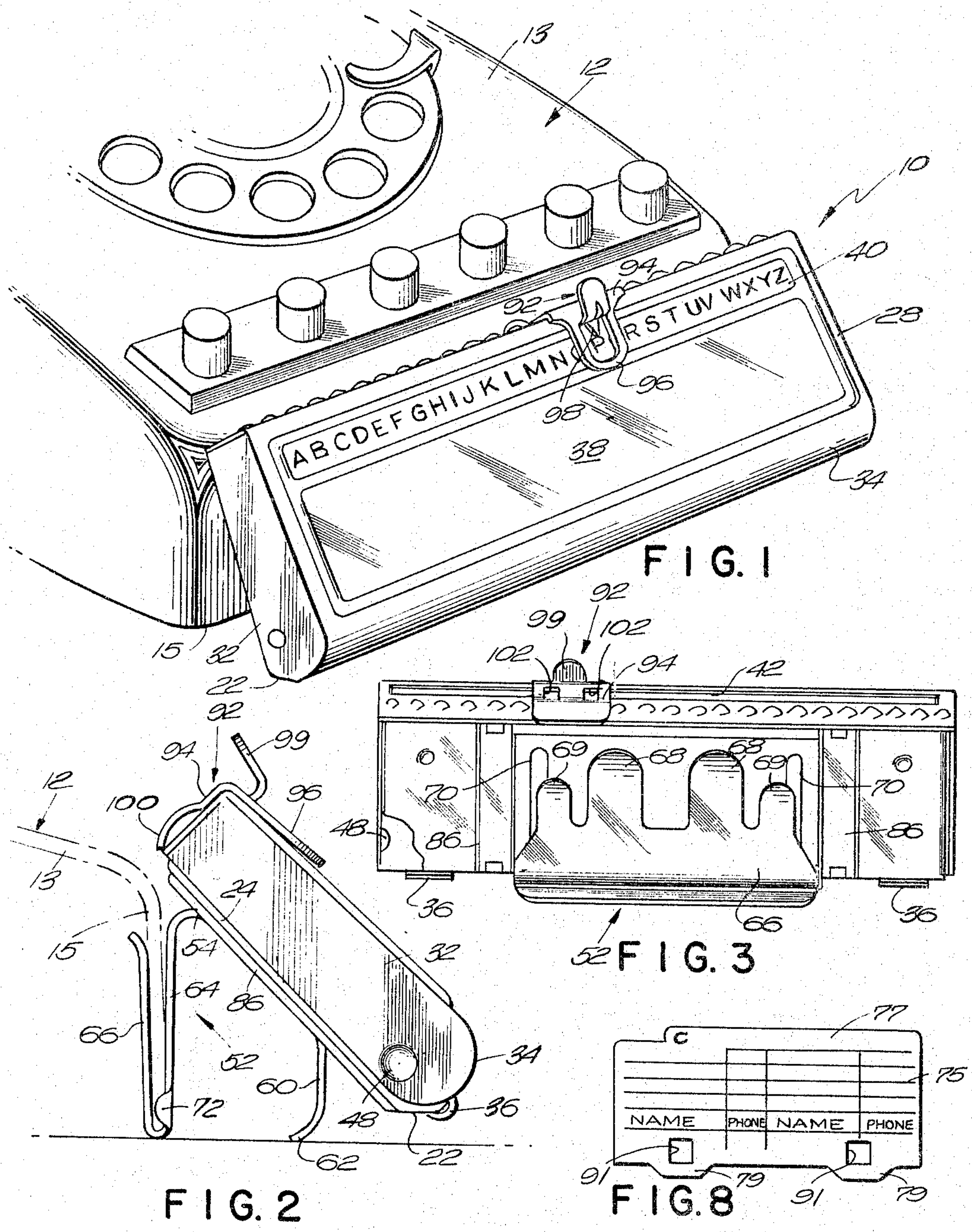
FIG. 1 is a perspective view showing the index device embodied in the present invention in the mounted position thereof on a desk telephone.
FIG. 2 is an end elevational view of one form of the index device embodied herein and showing the mounted position thereof.
FIG. 3 is a rear elevational view of the index device illustrated in FIG. 2.
FIG. 8 is an elevational view of one of the index cards of the index book.

Referring now to the drawings, and particularly to FIG. 1, one form of the index device embodied in the present invention is generally indicated at 10 and, as shown, is mounted for use on a desk telephone generally indicated at 12, the telephone including a body portion 13 having a forward wall 15. It is understood, however, that the concept of the invention is not limited to the use thereof with a desk telephone, and, as will be described hereinafter, a modified form of the invention provides for use of the index device with various styles of telephones, including wall telephones now in general use.

Figures 4, 5, 6, 7, 9:
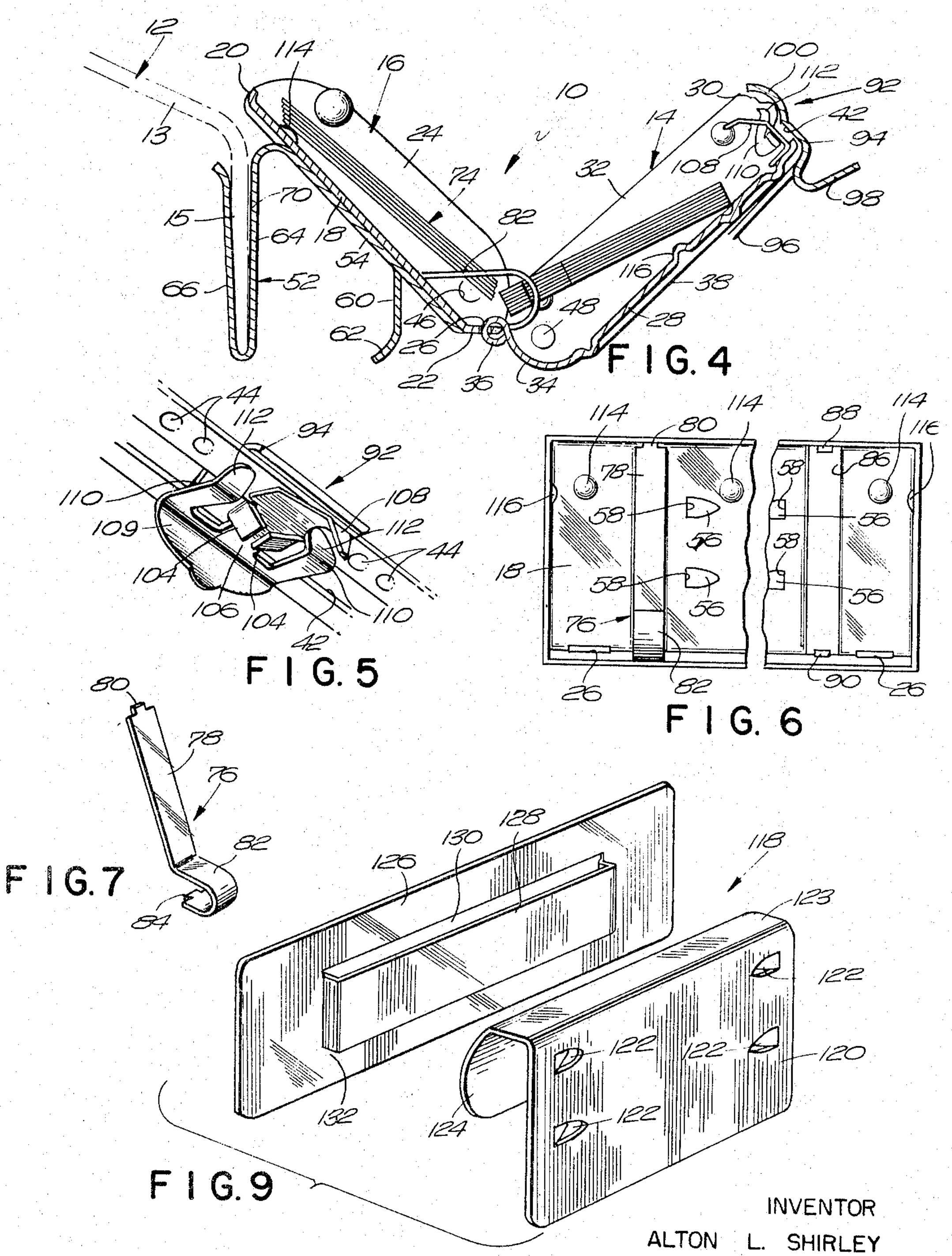
FIG. 4 is a vertical sectional view of the index device shown in FIGS. 2 and 3 and with the casing located in the open position thereof.
FIG. 5 is an enlarged rear perspective of the slide assembly embodied in the present invention as mounted on the front section of the casing.
FIG. 6 is a fragmentary view of the inside of the rear section section of the casing showing the location of a spring clip therein.
FIG. 7 is a perspective view of one of the spring clips employed for mounting the index book within the casing.
FIG. 9 is an exploded perspective view showing a modifier form of a mounting clip assembly that is employed for mounting the index device on a telephone.

Referring now to FIGS. 2, 3 and 4, the index device 10 as shown includes a casing that is defined by a front section generally indicated at 14 and a rear section generally indicated at 16. The rear section 16 includes a rear wall 18 that is formed with an upper lip 20 and to which an inclined bottom wall 22 and side walls 24 are joined. The side walls 24 are formed with an increasing taper toward the lower end thereof and cooperate with tapered side walls formed on the front section to define a tapered casing, the purpose of which will be described hereinafter. Formed in the bottom wall 22 are spaced openings 26 that are adapted to receive hinge elements therein, the hinge elements being formed on the front section 14 for pivotally interconnecting the front and rear sections.

The front section 14 includes a front wall 28 to which a top wall 30, tapered side walls 32 and a curved bottom wall 34 are joined. Formed as integral extensions of the curved bottom wall 34 are spaced hinge elements 36 that extend through the openings 26 formed in the bottom wall 22 for hingedly interconnecting the front and rear sections. As shown in FIG. 1, the front wall 28 of the front section 14 is provided with a decorative covering indicated at 38 that includes an indicia identifying area 40 on which the letters of the alphabet are located in longitudinal spaced relation. The top wall 34 is formed with a slot 42 as indicated in FIGS. 3 and 4 for receiving a selector assembly to be described. Located adjacent to the slot 42 are a plurality of protuberances that define spaced depressions 44 on the underside of the top wall 30. As will be described, the depressions 44 are oriented with respect to the letters appearing on the identifying area 40 and an index book located interiorly of the casing and are adapted to position a selector assembly for the opening of the casing at the selected index card of the index book.

In the closed position of the casing, the lip 20 formed on the rear wall 18 of the rear section 16 is received within the top wall 30 of the front casing 14, and the side walls 24 of the rear casing 16 are received within the side walls 32 of the front casing. In order to positively locate the front and rear sections in the closed position thereof, the side walls 24 of the rear section 16 are formed with small openings 46 adjacent to the lower end thereof (see FIG. 4). Located on the side walls 32 of the front section 14 are ball-type projections 48 that are received within the openings 46 when the sections are disposed in the closed position thereof. The projections 48 formed on the front section 14 are slightly larger than the openings 46, and since the projections have a semi-cylindrical configuration, they are received within the openings 46 without passing therethrough. Thus, some tension is maintained between the sections as they are moved to the closed position thereof.

In the form of the invention as illustrated in FIGS. 2, 3 and 4, the index device 10 is adapted to be mounted on the front wall 15 of the telephone 12 by a mounting clip generally indicated at 52. The mounting clip 52 includes an inclined mounting plate 54, out of which a plurality of mounting tabs 56 are punched (see FIG. 6), the mounting tabs 56 extending through slots 58 formed in the rear wall 18 of the rear section 16. Extending downwardly from the mounting plate 54 at an angle with respect thereto is a vertical portion 60 that terminates in a curved lower edge 62, the edge 62 engaging the surface on which the telephone 12 rests for supporting the index device 10 in proper position on the telephone. As illustrated in FIGS. 2 and 4, the edge 62 is curved so as to prevent scratching of the surface on which the telephone and index device are located. Also joined to the mounting plate 54 and extending downwardly therefrom in spaced relation with respect to the vertical portion 60 is a clip portion defined by clip members 64 and 66. The clip members 64 and 66 are located in spaced relation for receiving the front wall 15 of the telephone 12 therebetween. As seen in FIG. 3, the clip member 66 is formed with a plurality of spaced fingers indicated at 68 and 69 that are arranged in such a manner as to project behind the front wall 50. The height and spacing of the fingers 68 and 69 are varied so as to avoid obstructions that appear on the under surface of the telephone 12. In order to strengthen the clip member 64, spaced ribs 70 are formed thereon, while stop tabs 72 are formed on the edges of the clip portion 64 adjacent to the lower end thereof, the lower edge of the front wall 15 of the telephone engaging the stop tabs 72 in the mounted position of the index device.

Since the mounting plate 54 is inclined with respect to the vertical and the index device 10 is secured directly thereto, it is seen that when the mounting clip is secured in place on the front wall 50 of the telephone 12, the index device will be located in a generally inclined position, thereby providing for easy viewing of the front wall 28 and the indicia area 40 of the front section 14. This location of the index device further provides for simple opening thereof for exposing a desired index card therein as will hereinafter be described. Located within the casing of the index device is an index book generally indicated at 74 that is defined by a plurality of index cards, each of which is mounted for pivotal movement and on which identifying indicia, such as a letter of the alphabet, appears. Referring to FIG. 8, one of the index cards is indicated at 75 and as shown includes a conventional tab portion 77 on which a letter appears and the length of which is determined by the letter appearing thereon. The card 75 has the usual columns imprinted thereon and further includes extensions 79 at the bottom thereof. The letters of the alphabet appearing on the tab portions 77 of the index cards 75 correspond to the letters located on the front wall of the front section 14.

In order to pivotally mount the index book 74 within the casing, a pair of spring clips generally indicated at 76 are provided. One of the spring clips 76 is illustrated in FIG. 7 and as shown includes a flat leg portion 78 that terminates at the upper end thereof in an ear 80. Joined to the leg 78 at the lower portion thereof is a foot portion 82 that is generally U-shaped in configuration, terminating at the edge thereof in an ear 84. In order to accommodate the spring clips 76 in the casing, the rear wall 18 of the rear section 16 is formed with spaced grooves 86 that terminate at the upper ends thereof in slots 88 and at the lower end thereof in slots 90. As seen in FIG. 8, each of the index cards 75 is provided with enlarged openings 91 that receive the foot portions 82 of the spring clips 76 therein. The index cards 75 are thus mounted for pivotal movement on the U-shaped foot portions 82 of the spring clips 76, and the spring clips are mounted in position by locating the ears 80 in the slots 88 and the ears 84 in the slots 90. As shown in FIG. 4, the configuration of the foot portions 82 enables the index cards to be pivotally moved thereon to the open position, the extensions 79 and enlarged openings 91 further aiding in this movement. When the spring clips 76 are mounted in position, the legs 78 are located within the grooves 86, and the foot portions 82 project outwardly from the rear wall 18 of the rear section 16 as illustrated in FIG. 4. The tapered configuration of the casing enables the foot portions 82 of the spring clips 76 to be easily accommodated in the lower portion of the casing. It is understood that any of the index cards may be removed from the book by simply disconnecting the spring clips 76 from the rear wall 18. This is accomplished by exerting downward pressure on foot portions 82 to release the ears 80 from the slots 88, the lower ears 84 thereafter being withdrawn from the slots 90.

One of the novel features of the invention is the selector assembly generally indicated at 92 and illustrated in detail in FIGS. 4 and 5. The selector assembly 92 is designed to provide for opening of the index casing for exposure of the index cards in accordance with the letter selected on the indicia area 40 of the front section 14. For this purpose, the selector assembly 92 includes a slide 94 located on the top wall 30 of the front section 14 and to which a selector guide 96 is joined in depending relation. The selector guide 96 has an opening formed therein that overlies the indicia or alphabet area 40. A pointer 98 is joined to the selector guide and projects into the opening therein and defines a means for positively locating the selector assembly at the letter desired. Also joined to the slide 94 and extending upwardly with respect to the guide 96 is a pull-tab 99 that is engageable by the finger of the user for pivoting the front section 14 rearwardly with respect to the fixed rear section 16.

The slide 94 is positioned over the slot 42 formed in the top wall 30 of the front section 14 and includes an arcuate-shaped portion 100 that projects over the protuberances that define the depressions 44. The guide 94 is thus mounted for sliding movement over the top wall 30. As shown in FIG. 3, the portion of the slide 94 that overlies the slot 42 is formed with cut-outs 102 from which mounting tabs 104 are formed. As shown in FIG. 5, the mounting tabs 104 are connected to a neck 106 that is formed integrally with a rearwardly extending pick-up finger 108. Also joined to the neck 106 is a guide portion 109 to which upwardly extending spring arms 110 are joined. The spring arms are bent inwardly at the tops thereof as indicated at 112, the outer edges of the bent portions 112 being spaced apart sufficiently so as to be received simultaneously in similarly spaced-apart depressions 44. The location of the bent ends 112 of the arms 110 are spaced such that movement of the selector assembly 92 will be in increments as the ends 112 move into and out of the depressions 44. The selector assembly 92 is thereby oriented with respect to the letters appearing in the indicia area 40 for location of the pick-up finger 108 at the proper position with respect to the index book 74 and in accordance with the location of the pointer 98. As seen in FIG. 4, the pick-up finger 108 extends rearwardly of the casing and is adapted to be disposed rearwardly of the index book 74 when the casing sections are in the closed position. The pick-up finger 108 is thus moved to the required location behind the index book 74, and upon forward pivoting movement of the front section 14, the pick-up finger 108 will engage the tab 77 of an index card 75 to open the index book at the desired location.

When the index casing is closed, it is necessary that the rear card of the index book 74 be spaced from the rear wall 18 of the rear section 16 so as to enable the pick-up finger 108 to move between the rear card of the index book and the rear wall 18. For this purpose, the inner surface of the rear wall 18 is provided with a plurality of spaced protuberances 114 which, as shown in FIG. 4, project outwardly a sufficient distance to provide for the proper spacing of the index book 74 with respect to the rear wall 18 when the index book 74 is in engagement therewith.

In the operation of the index device, the front section 14 is pivotally moved with respect to the rear section 16 carrying the index cards 74 therewith that are held by the pick-up finger 108. The exposed index cards 74 are thus available for inspection in the conventional manner. In order to prevent the cards behind the pick-up finger 108 from moving forwardly as the front section 14 is opened, end protuberances 116 are formed on the side walls 24 of the rear section 16. These end protuberances 116 provide a small amount of frictional engagement at the end edges of those cards located behind the pick-up finger, so that only the cards that are positively held by the pick-up finger will pivot forwardly and downwardly to the open position thereof.

Since it is essential that the index book 74 be completely closed when the casing is located in the closed position, a plurality of spaced protuberances are formed on the inner surface of the front wall 28 as indicated at 116 in FIG. 4, the protuberances 116 being designed to engage the index book 74 for exerting pressure on the cards 74 when the casing is closed.

When the index device 10 is located in the position of use as clamped to a telephone as illustrated in FIGS. 1, 2 and 4, the casing is disposed such that the index book 74 is inclined at slightly less than 45 degrees to the vertical. The index cards thus are disposed in a similarly inclined position within the casing. As previously described, movement of the index book 74 within the casing is provided for without interference since the bottom of the casing is formed somewhat larger than the top thereof. As has been further noted, the slots 92 in each of the index cards 75 are formed sufficiently large enough to provide for free movement of each of the cards on the clips 76 as the front section 14 is moved to the open position. In operation of the device, the selector assembly 92 is moved along the top wall 30 of the front casing 14 until the opening in the guide 96 is located over the required letter, the pointer 98 positively locating the selector assembly at the precise position required. With the pointer 98 disposed over the letter selected, the ends 112 of the arms 110 are disposed in the appropriate depressions 44, and in this position the pick-up finger 108 is located behind the index card 74 having the selected letter thereon. The user then engages the pull tab 99 and pulls the front section 14 forwardly, thereby pivoting the front section 14 with respect to the rear section 16 to an open position. The rounded bottom wall 34 of the front section 40 provides for complete opening movement of the front section to expose the index cards 75 therein, the cards retained behind the pick-up finger falling by gravity to the open position as the front section 14 is fully opened. The index cards that remain in the rear section 16 are restrained from movement forwardly by the side protuberances 116. The cards that are moved with the pick-up finger 108 freely pivot on the foot portions 82 of the spring clips 76, the somewhat larger bottom portion of the front and rear sections accommodating the foot portions 82 and the extensions 79 of the index cards. As the selector assembly 92 is moved along the top wall 30 prior to the opening of the casing, movement thereof is uniform and unimpeded because of the arrangement of the arms 110 of the selector assembly. Positive location of the pick-up finger 108 in accordance with the selection indicated by the pointer 98 is assured since the ends 112 of the arms 110 are spaced to always engage a pair of the depressions 44.

Referring now to FIG. 9, a modified form of the clip for mounting the index device on a telephone is illustrated. In the modification of the invention, a mounting clip generally indicated at 118 is provided and includes a mounting plate 120 that is formed with tabs 122 that extend through the slots 58 in the rear wall 18 of the casing for securing the mounting plate to the rear section 16. Joined to the mounting plate 120 is an upper wall 123 to which a downwardly extending curved clip portion or tongue 124 is joined, the tongue 124 being spaced from the mounting plate 120. In order to accommodate the tongue 124, a relatively flat bracket 126 is provided and may be secured to the front wall 15 of the telephone 12 by an adhesive or the like. It is understood that the braket 126 will not only be mounted on a desk telephone such as illustrated in FIG. 1, but may also be mounted on a front wall of a wall telephone or other surface as required. Formed out of the bracket 126 is a central strip 128 that is forwardly spaced with respect to the bracket to define slots 130 and 132 therewith. The clip portion or tongue 124 is designed to be inserted rearwardly of the strip 128 and into the slots 130, 132 for positively mounting the index device that is secured to the mounting plate 120 in position. It is understood that the index device as employed with the modified clip construction 118 is substantially the same as that described above.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. In an index device for attachment to a telephone, a casing having a front section on which identifying indicia are located and a rear section pivotally connected to said front section, an index book defined by a plurality of index cards located within said casing and having identifying indicia imprinted thereon corresponding to the indicia appearing on said front section, a mounting member joined to said rear section for attaching said device to said telephone, and a selector assembly mounted for slidable movement on said front section, said selector assembly including a selector element that is adapted to be aligned with one of said indicia on said front section, and a pick-up member interconnected to said selector element and movable into engagement with the index card in said casing corresponding to the indicia with which the selector element has been aligned, said mounting member including an attaching plate that is secured directly to the rear section of said casing, a rear portion joined to said attaching plate and located at an angle with respect thereto, and a plurality of fingers joined to said rear portion at the bottom thereof and extending upwardly in generally parallel spaced relation with respect thereto, said fingers being received behind a front wall of said telephone and cooperating with said rear portion to frictionally receive the front wall therebetween, and a curved bottom portion joined to said attaching plate for engagement on a top of a surface on which said telephone rests for protecting said surface when said device is in the position of use.

2. In an index device for attachment to a telephone, a casing having a front section on which identifying indicia are located and a rear section pivotally connected to said front section, an index book defined by a plurality of index cards located within said casing and having identifying indica imprinted thereon corresponding to the indicia appearing on said front section, a mounting member joined to said rear section for attaching said device to said telephone, and a selector assembly mounted for slidable movement on said front section, said selector assembly including a selector element that is adapted to be aligned with one of said indicia on said front section, and a pick-up member interconnected to said selector element and movable into engagement with the index card in said casing corresponding to the indicia with which the selector element has been aligned, said mounting member including an attaching plate that is secured directly to the rear section of said casing, a tongue portion joined to said plate at the top thereof and extending downwardly in spaced relation thereto, and a mounting plate secured to a front portion of said telephone and having spaced, parallel slots formed therein through which said tongue portion extends for mounting said device on said telephone.

3. In an index device for attachment to a telephone, a casing having a front section on which identifying indicia are located and a rear section pivotally connected to said front section, an index book defined by a plurality of index cards located within said casing and having indentifying indica imprinted thereon corresponding to the indicia appearing on said front section, a mounting member joined to said rear section for attaching said device to said telephone, and a selector assembly mounted for slidable movement on said front section, said selector assembly including a selector element that is adapted to be aligned with one of said indicia on said front section, and a pick-up member interconnected to said selector element and movable into engagement with the index card in said casing corresponding to the indica with which the selector element has been aligned, means joined to the interior of said rear section at the sides thereof for engaging the side edges of said index book and restraining forward movement of those cards not moved with said pickup member when the front section is pivotally moved with respect to said rear section, said rear section including a rear wall on the interior surface of which a plurality of projections are located, said projections defining a stop for said index book and providing for a space between the last card and said rear wall, said pick-up member extending into said space for movement therein the movement of said selector assembly.

4. In an index device as set forth in claim 3, said front section including a front wall on the inside surface of which a plurality of projections are formed, said front wall projections engaging the front card of said index book so as to retain the index book in a completely closed position when the front and rear sections of said casing are closed.

5. In an index device as set forth in claim 4, friction elements formed on said front and rear sections for engagement with each other in the closed position of said casing to positively lock said sections in the closed position.

6. In an index device for attachment to a telephone, a casing including a front section and a rear section pivotally interconnected to said front section, means joined to said rear section at the rear thereof for mounting said casing on a front portion of a telephone, wherein said casing is fixed in a generally inclined but upright position exteriorly of said telephone, means for pivotally interconnecting said front and rear sections adjacent to the lower edges thereof, wherein said front section is pivotally movable with respect to said rear section and in a direction away from said telephone so as to not visually obstruct the telephone operating mechanism, a plurality of index cards located within said casing and normally lying in a stack in said rear section and in a generally upright but inclined position, each of said cards having an identifying letter imprinted thereon, and a selector assembly mounted for sliding movement on said front section adjacent to the upper edge thereof, said selector assembly including a pointer that is movable over an alphabet identifying area on said front section for locating the selector assembly at a preselected letter that corresponds to an index card, a pick-up member interconnected to said pointer and movable into engagement with the index card that corresponds to the letter at which the pointer is located, and a pull tab interconnected to said pointer and pick-up member at the upper end of said casing and movable therewith, said pull tab being movable rearwardly by the user of the device for pivotally moving said front section with respect to said fixed rear section so as to separate said sections, the front section being movable to a generally horizontal location in the open position to expose the preselected card in said casing that corresponds to the letter at which said selector assembly is located.

7. In an index device as set forth in claim 6, a pair of spring clips removably secured to the rear section interiorly of said casing, each clip including a projecting foot portion on which said index cards are pivotally mounted and a leg portion that cooperates with said foot portion for retaining the clips in engagement with said rear section.

8. In an index device as set forth in claim 6, said selector assembly further including a slide to which the selector element and pick-up member are joined, said front section having a top wall in which a plurality of depressions are formed in spaced relation, a pair of spaced arms joined to said pick-up member and including head portions that are engageable in said depressions, said depressions defining means for locating said pick-up member in alignment with the index card to be engaged and in accordance with the location of the selector element.

9. In an index device as set forth in claim 6, means joined to the interior of said rear sections at the sides thereof for engaging the side edges of said index book and restraining forward movement of those cards not moved with said pick-up member when the front section is pivotally moved with respect to said rear section.

References Cited

UNITED STATES PATENTS

| | | | |
|---|---|---|---|
| 2,593,475 | 4/1952 | Neilsen | 40—104 |
| 2,849,815 | 9/1958 | Neilsen | 40—104 |

EUGENE R. CAPOZIO, *Primary Examiner.*

W. GRIEB, *Assistant Examiner.*